Dec. 9, 1952     H. M. GEYER     2,620,683
ACTUATOR WITH DUAL DRIVE
Filed Sept. 21, 1951     4 Sheets-Sheet 1
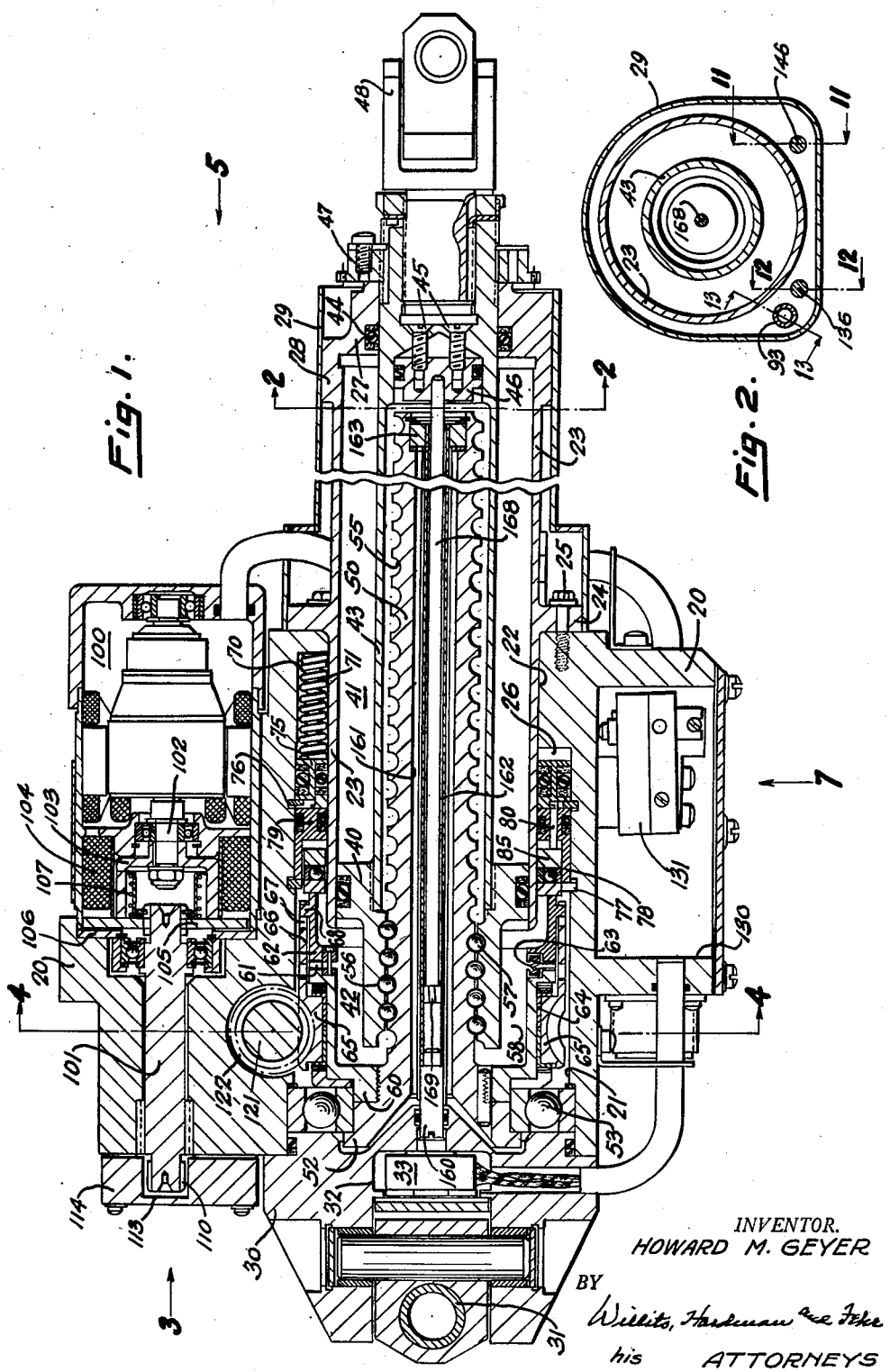
INVENTOR.
HOWARD M. GEYER
BY Willits, Hardman and Fike
his ATTORNEYS Dec. 9, 1952      H. M. GEYER      2,620,683
ACTUATOR WITH DUAL DRIVE
Filed Sept. 21, 1951      4 Sheets-Sheet 2
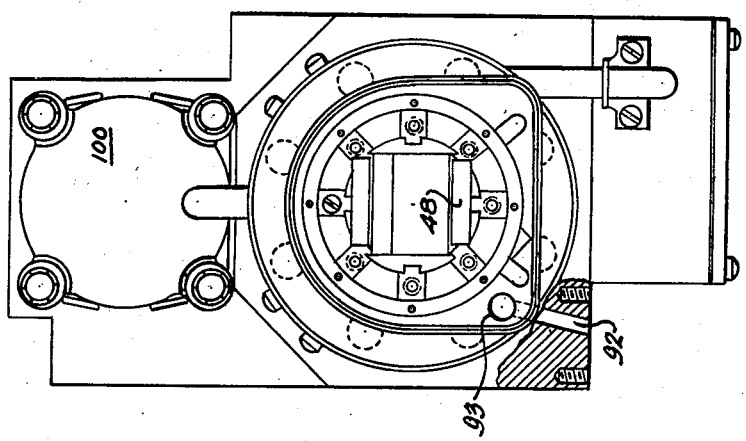
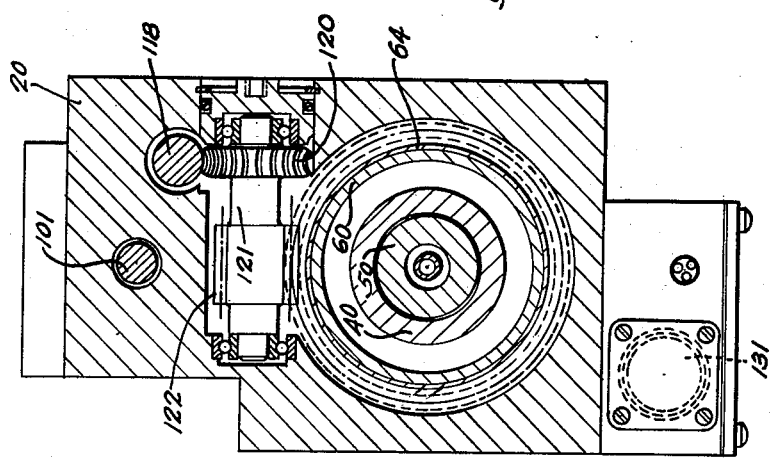
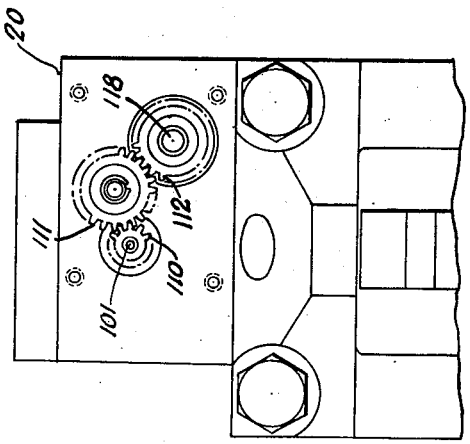
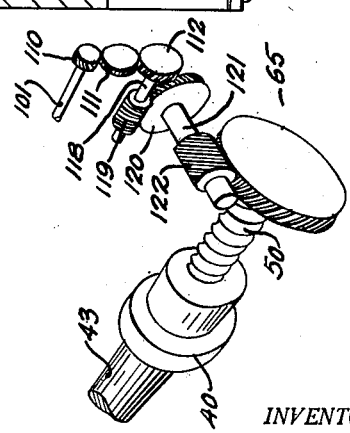
INVENTOR.
HOWARD M. GEYER
BY
Willits, Hardman and John
his ATTORNEYS.

Dec. 9, 1952          H. M. GEYER          2,620,683
ACTUATOR WITH DUAL DRIVE
Filed Sept. 21, 1951          4 Sheets-Sheet 3
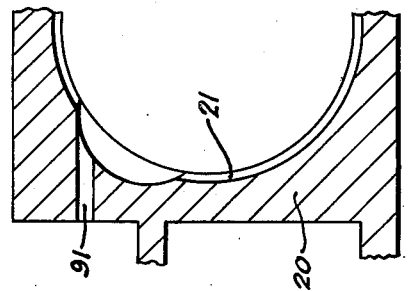
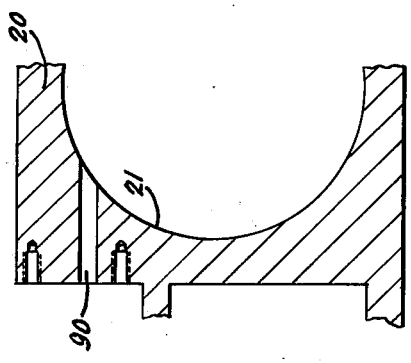
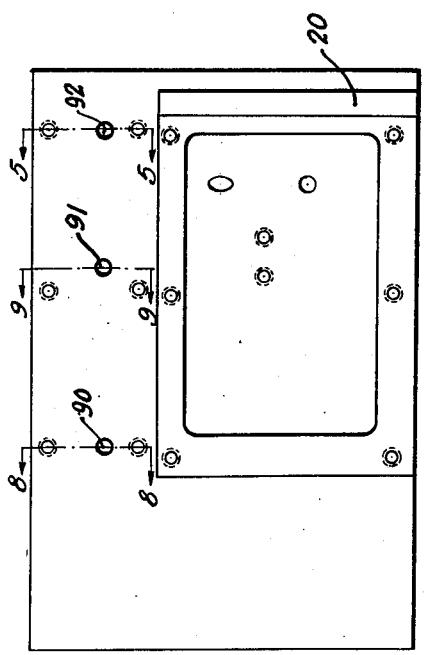
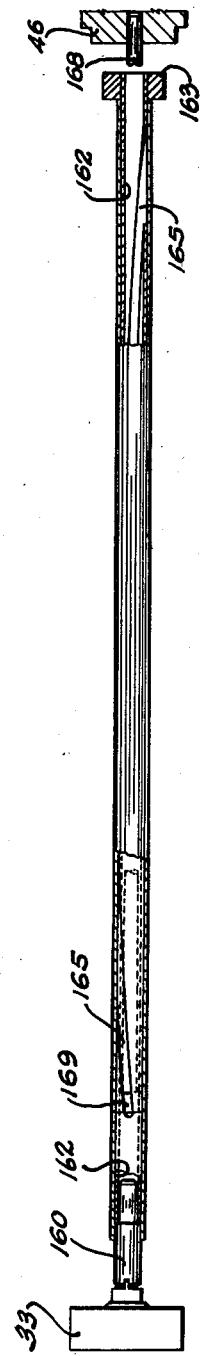
INVENTOR.
HOWARD M. GEYER
BY
Willits, Hardman and Me
his     ATTORNEYS.

Dec. 9, 1952 H. M. GEYER 2,620,683
ACTUATOR WITH DUAL DRIVE
Filed Sept. 21, 1951 4 Sheets-Sheet 4
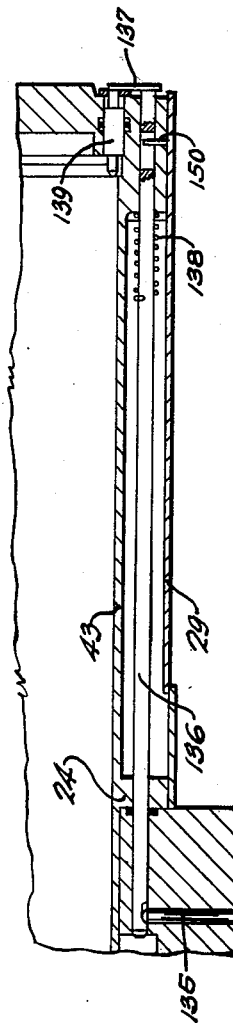
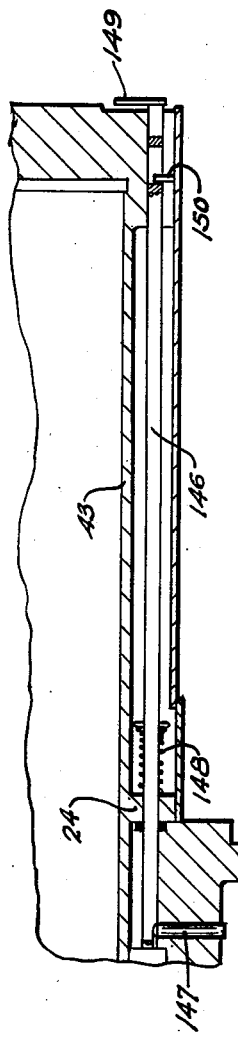
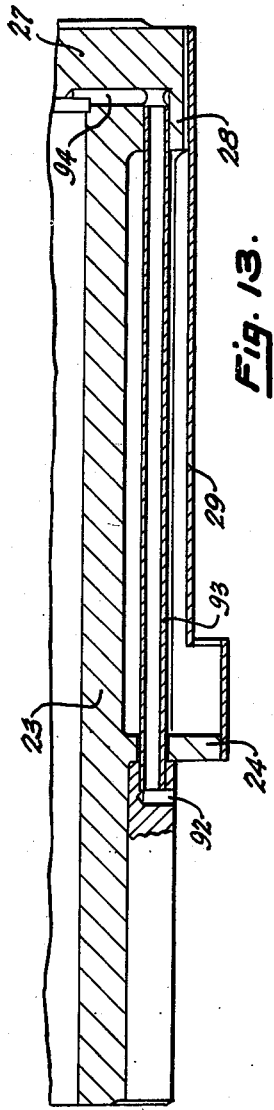
INVENTOR.
HOWARD M. GEYER
BY
Willits, Hardman & Fisher
his ATTORNEYS.

Patented Dec. 9, 1952

2,620,683

UNITED STATES PATENT OFFICE 2,620,683

ACTUATOR WITH DUAL DRIVE

Howard M. Geyer, Dayton, Ohio, assignor to General Motors Corporation, Detroit, Mich., a corporation of Delaware Application September 21, 1951, Serial No. 247,737

13 Claims. (Cl. 74—665)

This invention relates to an improved power transmitting mechanism.

It is among the objects of the present invention to provide a power transmitting mechanism of sturdy structure and minimum weight so as to be particularly adaptable for use on aeronautical vehicles to adjust rudders, stabilizer, wing flaps, ailerons or any other members of the vehicle.

A further object of the present invention is to provide a power transmitting mechanism which may be actuated to perform its adjusting function by two separate motivating means, such as hydraulic pressure and electromotive force, one acting as the primary motive force the other as an auxiliary force adapted to be utilized to drive the power transmitting mechanism if and when the primary source of power fails or is rendered inoperative in any manner.

A still further object of the present invention is to provide a unitary power transmitting device as defined in the aforegoing paragraph in which the parts, actuated by the auxiliary, electromotive force, when inactive, cooperate with the parts motivated by hydraulic pressure to render the entire device operative by the primary source of power and in which said entire device is operative by the electromotive force independently of the hydraulic pressure.

Further objects and advantages of the present invention will be apparent from the following description, reference being had to the accompanying drawings wherein a preferred embodiment of the present invention is clearly shown.

In the drawings:

Fig. 1 is a longitudinal, sectional view of the unitary power transmitting mechanism.

Fig. 2 is a transverse sectional view taken along the lines and in the direction of arrows 2—2 of Fig. 1.

Fig. 3 is a fragmentary end view of the unit, taken in the direction of the arrow 3 of Fig. 1. A cover is removed for illustrating gearing.

Fig. 4 is a transverse sectional view taken along the lines 4—4 of Fig. 1, certain parts being omitted for the sake of clearness.

Fig. 5 is a full end view of the device taken in the direction of arrow 5 of Fig. 1. The sectional portion in this figure is taken along the lines 5—5 of Fig. 7.

Fig. 6 is a schematic, perspective view of the gearing connecting the electric motor with the driven element of the device.

Fig. 7 is a view of the housing portion of the device taken in the direction of arrow 7 in Fig. 1.

Fig. 8 is a detailed sectional view, on an enlarged scale taken along the lines and in the direction of arrows 8—8 of Fig. 7.

Fig. 9 is a similar sectional view taken along the lines and in the direction of the arrows 9—9 of Fig. 7.

Fig. 10 is a view detailedly showing the structure of the potentiometer actuating mechanism.

Fig. 11 is a fragmentary sectional view taken along the lines 11—11 of Fig. 2.

Fig. 12 is a similar sectional view taken along the lines 12—12 of Fig. 2, and

Fig. 13 is a detailed sectional view taken along the lines 13—13 of Fig. 5.

The power transmitting unit of the present invention is particularly adapted for use in aeronautical vehicles for the purpose of adjusting movable parts thereof which would require considerable force under certain circumstances. The unit comprises two relatively movable portions, one of which is adapted to be secured to an immovable portion of the vehicle while the other is attached to the portion of the vehicle desired to be adjusted, whereby in response to relative movements of the two portions of the power transmitting mechanism the movable part of the vehicle will be adjusted. As aforementioned, two motivating forces may be used to activate the device, one being hydraulic fluid pressure, the other electromotive power in the form of an electric motor. In this instance the hydraulic pressure is the primary force which moves the two relatively movable members, the other secondary or auxiliary force being in the form of an electric motor also adapted, when energized, to cause relative movement between the two parts of the unit.

The power transmitting unit consists of a housing 20 having several recesses for receiving certain parts of the unit. One of these recesses extending from one end of the housing to the other provides a chamber having one diameter portion 21 and a smaller diameter portion 22. The working cylinder 23 of the unit fits into and extends through the smaller diameter recess portion 22 of the housing, the cylinder having an outwardly extending annular flange 24 between its ends, said flange being apertured to receive screws 25 for securing the cylinder to the housing. As shown in Fig. 1, the cylinder extends inwardly into the housing and particularly into the larger diameter recess portion 21, thereby forming an annular chamber 26 between the cylinder and the adjacent inner wall 21 of the housing. The outer end of the cylinder has a head member 27, centrally apertured for purposes to be described. Adjacent the outer end of cylinder 23 there is an outwardly extending flange 28 about which the shell 29, D-shaped in cross section is secured, the shell being formed to surround and be attached to the annular flange 24 of the cylinder. As shown in Fig. 2, the shell 29 is D-shaped to provide enlarged corner spaces between the adjacent wall of the cylinder 23 and the casing 29 to permit inclusion of certain rods and a pipe as will later be described. The end of the housing 20 in which the larger diameter recess portion 21 terminates is sealingly closed by a cover cap 30 secured to the housing in any suitable manner. Cap 30 provides trunnion 31 by means of which this portion of the power transmitting unit may be attached either to the stationary portion of the vehicle or to the member of the vehicle desired to be adjusted. Cover cap 30 also has a recess 32 for housing the potentiometer 33 which, as will later be described, provides a means for indicating position of the actuator.

A piston 40 is reciprocatively contained within the cylinder 23 dividing said cylinder into two compartments, the one being designated by the numeral 41 which is the compartment on one side of the piston, more specifically on the cylinder head side of the piston, the other compartment being designated by the numeral 42 which is really the interior of the housing defined by the larger diameter recess wall 21 and into which the cylinder 23 extends. On the side of the piston 40 adjacent the cylinder head 27, there is provided a cylindrical extension 43 which is slidably supported in the central opening of the cylinder head 27, a seal 44 being placed in the cylinder head to minimize fluid leak at this point. The end of the cylindrical extension 43 on piston 40 has a closure wall through which two screws 45 project for securing a block 46 inside the cylindrical projection for purposes to be described. Cylindrical projection 43 extends outside the confines of the cylinder head 27 and has a collar 47 secured thereto so as to be adjustable longitudinal of the cylindrical extension for purposes to be described. In a recess at this end of the cylindrical extension 43 of piston 40 there is secured a clevis 48, supporting means by which the piston of the unit may be anchored to either the stationary part of the vehicle to which the unit is attached or to the part thereof to be adjusted.

Extending through an axial opening in the piston 40 and into the interior of the cylindrical projection 43 thereof is a shaft or rod 50 the one end of which, when the unit is completely contracted as shown in Fig. 1, lies adjacent the block 46 secured to the closure wall of said cylindrical extension. The opposite end of this rod or shaft 50 has a head member 52, annular in shape and of larger diameter than the body portion of the rod or shaft, said head 52 being supported in the housing 20 by a bearing 53 shown in the present drawings to be a ball bearing including an inner race encompassing the head 52 and an outer race fitting within the recess 21 of the housing. This ball bearing is maintained in proper position against an annular shoulder in the recess 21 of housing 20 by the end cap or cover 30. The main body portion of the rod or shaft 50 is mechanically connected to the piston 40 so that reciprocation of the piston within the cylinder will effect rotation of said rod or shaft. In the present drawings the well known ball-screw connection is utilized, the shaft 50 having a spiral groove 55 provided in its outer peripheral surface, the inner surface of the piston 40 encompassing the shaft having a coinciding spiral groove 56. Both these spiral grooves cooperate to form a spiral channel between the shaft and the piston in which a plurality of balls 57 may circulate by the assistance of an outer duct 58 carried by the piston, whereby said piston 40 is mechanically connected to the shaft 50 in the manner of screw threads. This mechanical connection provides for rotation of the shaft 50 in response to reciprocation of the piston 40 within the cylinder and under some circumstances reciprocation of the piston 40 in the cylinder in response to rotation of the shaft 50.

The head portion 52 of the shaft 50 has an intermediate diameter portion to which a cup-shaped member 60 is fastened in any suitable manner so that said cup-shaped member 60 and the shaft will rotate as a single unit. This cup-shaped member 60 encompasses the piston 40, the outer end edge of said member 60 being serrated to provide clutch teeth 61. These clutch teeth 61 are engageable by corresponding clutch teeth provided in one end edge of the clutch ring 62. The contiguous surfaces of the toothed ends of the member 60 and the clutch ring 62 have a plurality of aligned pairs of recesses in each of which a spring 63 is housed, each spring being of predetermined strength and normally urging the clutch ring 62 so that its toothed edge is moved out of gripping engagement with the cooperating toothed edge of the cup-shaped member 60. A sleeve bearing 64 is immovably supported on the outer annular wall of the cup-shaped member 60, this sleeve bearing supporting a worm gear 65. This worm gear 65 is adapted to be engaged by a worm as will later be described. Worm gear 65 has a cylindrical extension 66 which fits about the clutch ring 62. The outer end of this cylindrical extension 66 has a plurality of notches 67 each of which receives an extension 68 provided on the clutch ring 62. Extensions or prongs 68 on the clutch ring 62 extending into the notches 67 in the worm gear extension 66 drivingly connect the worm gear 65 and clutch ring 62, permitting axial movement of the clutch ring 62 relative to the cylindrical extension 66 of the worm gear but permitting no relative rotative movement therebetween.

The annular ledge provided between the two different diameter recesses 21 and 22 of the housing has a plurality of recesses 70 therein each containing or housing a coil spring 71, these springs 71 being substantially stronger than the springs 63 and therefore springs 71 are capable of overcoming any opposing effect offered by springs 63. Each spring 71 engages a ring piston 75, slidably carried in the annular space 26 between the housing wall and inwardly extending cylinder, this ring piston being properly sealed to prevent fluid leakage thereby. A stop ring 76, secured in the housing recess 21, limits the movement of piston 75 under the effect of the engaging springs 71. Another abutment or stop ring 77 is provided in the recess 21 spaced from the stop ring or abutment 76. This stop ring 77 is engageable by the cylindrical extension 78 of member 79 slidably supported within the space 26 and between the stop rings 76 and 77 extending inwardly into this space. The slidable member 79 has a plurality of through passages arranged therein in an annular row and in each one of the through passages a pin 80 is slidably supported. This pin 80 has its one end anchored to the piston 75 so that the pins are moved slidably in the carrier 79 by movement of the piston 75. Pins 80 engage a thrust collar 85 slidable within the cylindrical extension 78 of member 79, this thrust collar 85 having component parts which engage the annular end edge of the ring clutch 62 opposite the end edge provided with the teeth. From this it may be seen that springs 71 normally urge the piston 75 outwardly of the recess 21 toward the clutch ring 62 so that the pins 80, attached to the piston, move slidably through the carrier member 79 and, engaging the thrust ring or collar 85, cause it to urge the ring clutch 62 toward the cup-shaped member 60 secured on the shaft 50, so that the teeth of ring clutch 62 engage the corresponding and cooperating teeth 61 on the cup-shaped member 60 whereby cup-shaped member 61 and the clutch member 62 are securely held together so as to prevent relative rotative movement therebetween. This will prevent any rotation of the shaft 50 until such a time as the ring clutch 62 is actuated to move its teeth out of engagement with the corresponding teeth on the member 60 attached to shaft 55.

As has been stated, hydraulic pressure is the main or primary motivating force for the power transmitting mechanism for the present invention. Thus in order to reciprocate the piston 40, fluid pressure must be introduced into the cylinder on one side or the other of said piston. Also to permit reciprocation of the piston within the cylinder the shaft 50 must be permitted to rotate, any prevention of rotation of shaft 50 locking the piston 40 against reciprocation.

Fig. 7, which is a view of the housing shown in Fig. 1, taken in the direction of arrow 7 in said Fig. 1, illustrates ducts in the housing with which fluid pressure introducing pipes or conduits may be connected in any suitable manner. In order to reciprocate the piston 40 toward the cylinder head member 27 or to the right as regards Fig. 1, fluid pressure must be introduced into the housing chamber 42 so that it may be applied to the end of the piston at the open end of the cylinder or adjacent the cup-shaped member 60 attached to member 50. Duct 90 illustrated in Figs. 7 and 8 is the duct which leads through the housing and terminates in the recess portion 21 of the housing. Any fluid under pressure introduced into this portion of the housing will be directed against the proper end of piston 40 to move it toward the cylinder head 27. In order that the shaft 50 may be rotated so as to permit such reciprocation of the piston 40, clutch ring 62 must be removed from engagement with the teeth 61 on the cup-shaped member 60. For this purpose duct 91 is provided in the housing which directs fluid under pressure from the source of supply to the interior of the annular space 26 between the movable carrier 79 and the ring piston 75 adjacent thereto, this pressure receiving space being occupied partially by the stop ring 76. When fluid pressure is introduced into this space piston 75 is moved inwardly against the effect of the springs 70 and in so moving pins 80 are drawn by said piston to move away from the end thrust-member 85 thereby relieving the pressure of spring 71 thereon. With the pressure of springs 71 removed from the end thrust member 85 weaker springs 63 are rendered effective to move the ring clutch 62 axially relatively to its supporting cylindrical projection 66 of worm gear 65 and thus move the clutch teeth on the ring clutch 62 out of engagement with the clutch teeth 61 on the cup-shaped member 60 attached to shaft 50. Now the cup-shaped member 60 and its attached shaft 50 may rotate and consequently piston 40 may move under fluid pressure toward the cylinder head 27.

To reciprocate piston 40 in the opposite direction, that is, away from the cylinder head 27, fluid pressure must be introduced into chamber 41 within the cylinder. This is accomplished by directing fluid through the duct 92 in the housing shown both in Figs. 5 and 7. In Fig. 13 it is shown how duct 92 communicates with a pipe 93 which extends through openings in adjacent portions of the housing and the flange 24 of the cylinder and through another opening in the flanges 28 of the cylinder to communicate with a cross passage 94 in the cylinder which opens into and communicates with the interior of the cylinder adjacent its bottom end or more specifically the end wall provided by the end member 27 of said cylinder. Thus, any fluid pressure introduced into duct 92 is directed through pipe 93 and duct 94 into the extreme end of the cylinder adjacent its closed end 27 and thus into the chamber 41 of said cylinder. This pressure reciprocates the piston and moves it away from head member 27 toward the cup member 60 on shaft 50. It will, of course, be understood that concurrently with the introduction of fluid pressure into either one of the cylinder chambers 41 or 42 fluid pressure must be introduced through the duct 91 to actuate the spring compressing ring piston 75 whereby spring 63 may become effective to disengage the ring clutch 62 from the cup shaped member 60 on shaft 50 to permit rotation of shaft 50 in response to reciprocation of piston 40. If at any time during the reciprocation of the piston, fluid pressure in either duct 90 or 92 and also in duct 91 is discontinued, then the clutch is again engaged to lock the shaft 50 against rotation and consequently the piston 40 will be held immovable in whatever position it has assumed by virtue of the previously applied fluid pressure on either side thereof.

As the piston 40 is moved toward the cylinder head end 27 the unit is extended and clevis 48 is moved outwardly thereby increasing the overall length of the unit and consequently moving the movable portion of the vehicle to which it is attached relatively to the stationary portion of the vehicle to which said unit is also anchored. When the piston is moved away from the cylinder end 27 the actuator is contracted and the overall length between clevis 48 and the mounting member at the opposite end of the unit is shortened whereby a reverse movement of the movable part of the vehicle is effective.

During the actuator operation the functions of ports or ducts 90 and 92 alternately change. As the actuator is operated in one direction port 90 is the fluid pressure inlet and port 92 the fluid discharge outlet. When the operation of the actuator is reversed 92 becomes the inlet port and 90 the discharge port.

Having described the mechanism of the unit as motivated by hydraulic pressure which is the primary motivating force, the secondary motivating force, an electric motor in this instance will now be described.

The secondary drive of the power transmitting mechanism is performed by an electric motor 100 which is supported by the housing 20. This electric motor is operative to drive an intermediate shaft 101 connected through speed reducing gearing with the worm gear 65. When the electric motor 100 is not activated it is not drivingly connected with the shaft 101. However, concurrently with the energization of the electric motor 100 a magnetic clutch, interposed between the motor and shaft 101, is energized and drivingly connected to so that the shaft 101 will be driven by the motor. Any suitable, electrically actuated clutch may be provided for this purpose. In the present instance the rotor shaft 102 of the electric motor has a cup-shaped element 103 attached thereto which is rotatable within a magnetic field created by the electromagnet 104 mounted within the motor housing in any suitable manner. The shaft 101 is journaled in the housing 20 and has a magnetic disc 105 keyed thereto so that said disc must rotate with shaft 101 but may move axially thereon. One side of this disc 105 is frictionally engageable with a braking disc 106 secured within the housing 20. This braking disc 106 is secured within the housing so that it is immovable particularly against rotative movement. Thus, when the electric motor is activated and the electromagnet 104 energized, a magnetic field is set up to attract the magnetic disc 105 secured to shaft 101, moving said disc into engagement with the cup 103 being rotated by the motor 100 and thereby moving said magnetic disc 105 out of frictional engagement with the stationary disc 106 so that said disc 105 with its attached shaft 101 will be rotated by the electric motor. When the electric motor is deenergized and consequently the electric magnet 104 is deenergized, spring 107, interposed between the cup-shaped element 103 on the rotor shaft and the magnetic disc 105 will urge said magnetic disc 105 away from the cup and into frictional, gripping engagement with the braking disc 106 immovably secured to the housing. This holds the shaft 101 against any rotative movement which might be transmitted thereto from the worm gear 65 through the connecting speed reducing gear.

Fig. 6 schematically shows the arrangement of the gearing connection between the motor driven shaft 101 and the ring gear 65 supported by the screw shaft 50. Motor driven shaft 101 has the pinion 110 attached thereto which meshes with an intermediate gear 111, said gear 111 in turn drivingly engaging another gear 112. Gears 110, 111 and 112 are outside the housing 20 and within the recess 113 provided in the cover 114 attached to the housing. Gear 112 is secured to a shaft 118 journaled in the housing 20 said shaft 118 also having a worm 119 secured thereto which operatively engages the worm gear 120 carried by a shaft 121 which also has another worm 122 secured thereto. Worm 122 operatively engages the worm gear 65 which, as has been previously described, is rotatably supported upon the cup-shaped member 60 attached to the shaft 50. Thus, when the motor 100 is operating, driving the shaft 101 through the electromagnetically actuated clutch, pinion 110 will drive gears 111 and 112. Rotation of gear 112 will rotate the worm 119 on the same shaft and this worm 119 will in turn rotate worm gear 120. Shaft 121 attached to worm gear 120 will be rotated and therefore worm 122 will also be driven to rotate the worm gear 65 with which it operatively engages. These respective gears are predeterminedly sized and constructed to drive the shaft 50 at a predetermined speed relatively to a fixed speed of the electric motor 100. It will be seen that when the worm gear 65 is rotated the ring clutch 62 will be rotated therewith due to the nubbles 68 of said ring clutch extending into elongated slots in the skirt of the worm gear 65.

During this time ring clutch 62 is held in gripping engagement with the clutch teeth 61 of the cup-shaped member 60 attached to shaft 50 and thus this shaft 50 will be rotated with the ring clutch 62. As the shaft 50 rotates, piston 40 will be reciprocated within the cylinder one direction or the other depending upon the directional rotation of the shaft 50 by reversible motor 100. It will be noted that when the secondary driver or electric motor is functioning the ring clutch 62 remains in driving connection with the toothed member 60 of the shaft 50. On the other hand when the primary power source or hydraulic fluid pressure actuates the mechanism ring clutch 62 is moved out of engagement with the toothed member 60 of the shaft 50 to permit rotation of the shaft 50 because the secondary drive, if permitted to remain in driving connection with the ring gear 65, would prevent shaft rotation and therefore prevent reciprocation of the piston by fluid pressure. Thus, the magnetic disc 105, frictionally engaging the brake ring or disc 106, together with the gearing connecting the shaft 101 to which the magnetic disc 105 is attached, act as a means for preventing rotation of the ring gear 65 while the electric motor or what is termed the secondary drive is inactive.

Limiting means are provided in the device for stopping motor operation when the piston 40 and its accoutrements reach the limit of their travel in one direction or the other. This means is clearly illustrated by the Figs. 11 and 12. Fig. 1 shows the housing 20 as having a recess 130 in which limit switches (only one, 131, being shown) are contained. These switches are identical and each connected in circuit between the source of power and the electric motor. They are actuated by plungers slidably supported within the housing and when depressed break the circuit to the electric motor and stop it, but when released complete one gap on the electric circuit to the motor. Fig. 11 illustrates the means for stopping the motor when the piston 40 has been reciprocated to its fully outward position in which the power transmitting mechanism is fully extended. The numeral 135 designates the plunger containing channel through which one actuating plunger slidably extends in the housing 20. This plunger is engageable by a rod 136 which extends along the outside of the cylinder 43 and has a plate or finger 137 attached thereto. Rod 136 is yieldably urged in one direction by a spring 138 located within the space between the cylinder 23 and the shell 29. In the end 27 of the cylinder a plunger 139 is slidably supported, one end of the plunger extending outside the cylinder and being engaged by the finger 137 attached to rod 136, the inner end of said plunger extending into said cylinder and being engageable by the one side of the piston 40 as it approaches the closed end of the cylinder in its extending stroke. When the piston 40 engages plunger 139, said plunger is forced outwardly of the cylinder and consequently moves the rod 136 to the right against the effect of spring 138 thereby causing the rod 136 to actuate the switch plunger 135 in the housing 20 to actuate its switch into the circuit breaking position so that the motor will be stopped and rotation of the shaft 50 discontinued. Fig. 12 shows the mechanism for stopping the electric motor when the piston 40 approaches its limit of movement inwardly or as the power transmission device is fully retracted. Here the cylinder casting slidably supports a rod 146, the one end of which operatively engages the plunger 147 of the second limit switch in a recess of housing 120. A spring 148 yieldably holds the rod 146 in a normal position. The end of rod 146 extends outside the cylinder casting and has a finger 149 attached thereto, which, when the piston approaches its limit of inward movement, is engaged by the collar 47, adjustably secured to the outer end of the piston projection 43, so that rod 146 is pushed inwardly against the effect of spring 148 to actuate the plunger 147 of the switch and thereby operate the switch to break the motor circuit and stop motor operation. This ring 47 on the piston extension 43 is adjustable longitudinally on said extension and has means for locking it in adjusted position so that the opening of the switch to stop motor operation as the piston approaches its inward limit of travel may be properly timed. Both rods 136 and 146 have slots therein into which stop and rotation preventing pins 150 extend, said stop pins being carried by the cylinder casting and preventing rotation as well as limiting the movement of said pins by their respective springs 138 and 148. Other means of mechanical connection between the piston and the limiting switch actuating mechanism may be used in place of the pins 135 and 147.

The transmission device is provided with means whereby the operator at some remote point may ascertain the position of the piston within the cylinder and thus the degree of adjustment of the vehicle portion to which the device is attached. In this instance a potentiometer or any suitable device whose rotative motion is capable of providing visible indications at some remote point. This potentiometer is designated by the numeral 33 and has an operating stub shaft 160 extending from the end cover 30 into a central passage 161 provided throughout the entire length of the shaft 50. This stub shaft 160 is attached to a tube 162 which is rotatably supported in a bearing block 163 within a recess at the outer end of the shaft 50. This is clearly shown in Fig. 10 which also shows the tube 162 as having a spirally shaped slot 165 extending short of both ends of said tube, this spiral slot 165 being of less than one convolution for its entire length. A rod 168 has its one end fastened within the block 46 secured by screws 45 in the end closure member of the piston extension 43, this rod 168 extending through the tube 162 short of the opposite end of the tube and having a nubble 169 extending radially therefrom and into the spiral slot 165 of the tube. Thus, as the piston 40 and its extension 43 moves outwardly of the housing as shown in Fig. 1, the rod 168 will be moved axially of the tube 162 and the nubble 169 thereon will travel through the spiral groove 165 slowly turning the tube 162 as said nubble moves toward the end of the tube 162 rotatably supported in the bearing block 163 carried by the piston extension 50. As the tube 162 is rotated it rotates the element 33 which may be a potentiometer or any other suitable means for providing indicating impulses which may be transmitted to the operator at some remote point and thereby indicate the position of the nubble 169 in the tube 162 or more specifically the position of the piston 40 in the cylinder 23. By knowing the position of the piston in the cylinder the operator immediately is informed into what position of adjustment the vehicle element attached to the power transmission device has been moved.

While the embodiment of the present invention as herein disclosed, constitutes a preferred form, it is to be understood that other forms might be adopted.

What is claimed is as follows:

1. An actuator comprising in combination, a cylinder; a reciprocative piston in said cylinder; a shaft extending through the piston and threadedly connected therewith so as to be rotatable relative thereto; clutch means engaging the shaft to lock it against rotation; releasing means operative in response to fluid pressure for actuating the clutch means to free the shaft from the clutch; means operative concurrently to introduce fluid under pressure into either end of the cylinder and to the releasing means for reciprocating the piston and freeing the shaft to permit rotation thereof; a member mechanically connected with the clutch means, said member being operative to hold said clutch means against rotation and when rotated to rotate the clutch means; an electric motor; and a train of gearing connecting the motor with said member for either holding or rotating it.

2. An actuator comprising in combination, a housing providing a cylinder; a piston in said cylinder, said piston having a tubular extension slidably extending through a closure member at one end of the cylinder; a rod extending through the piston and into its tubular extension; means mechanically connecting the piston to the rod so that reciprocation of the piston rotates the rod; clutch means engageable with the rod for holding it against rotation and preventing reciprocation of the piston; ducts in the housing for introducing fluid under pressure into the cylinder either above or beneath the piston; means operative to disengage the clutch means from the rod and free the rod to permit its rotation; a duct in the housing for directing fluid under pressure to said clutch disengaging means for operating it; and electric motor driven means connected with the clutch means for holding the clutch means against rotation or for rotating the clutch means to rotate the shaft and thereby reciprocate the piston.

3. An actuator comprising in combination, a cylinder provided with a head member at one end; a housing supporting the cylinder and providing a fluid chamber in communication with the other end of the cylinder; a reciprocative piston in said cylinder provided with an axial passage in which one end of a tubular extension is rigidly secured, said extension being slidably supported in the cylinder head and closed at its outer end; means on the housing and at the closed end of the tubular extension of the piston for attaching the actuator to the members to be actuated; a rod extending axially through the piston and into its tubular extension; a coinciding spiral groove formed in the contiguous surfaces of the piston and rod, said grooves forming a spiral channel containing circulating balls which mechanically connect the piston to the rod in the manner of screw threads; a clutch engaged shell anchored to the rod; a spring loaded clutch releasably urged into gripping engagement with said shell; a sleeve journaled on said shell and mechanically connected to the clutch; ducts in the housing, one communicating with the fluid chamber, the second with the interior of the cylinder adjacent its head member and the third with the clutch spring loading means, respectively operative to direct fluid under pressure into the actuator for reciprocating the piston in one direction, in the other direction and for effecting release of the rod by the clutch; an electric motor mounted on the housing; and gearing connected between the motor and clutch effective either to hold the clutch against rotation or to transmit rotative motion from the motor to the clutch.

4. An actuator comprising in combination, a cylinder having a head member; a housing supporting the cylinder and providing a fluid chamber in communication with said cylinder; a piston in the cylinder, said piston having a cylindrical extension slidably extending through the cylinder head member; a rod extending through the piston and threadedly connected therewith; a clutch member secured to the rod; a rotatable clutch releasably urged into gripping engagement with the said clutch member; a ring shaped piston slidable in an annular chamber between the housing and cylinder, said piston being mechanically connected to the clutch; springs urging the ring piston to move the clutch into engagement with the clutch member on the rod; means in the housing for directing fluid into the cylinder on one side or the other of the piston therein and concurrently into the ring piston chamber; and an electric motor having gear connections with the clutch operative to hold the clutch against rotation when said motor is inactive or to rotate said clutch when the motor is activated.

5. An actuator comprising in combination, a cylinder; a reciprocative piston in said cylinder capable of fluid pressure actuation in either direction; a rod extending axially through the piston and mechanically connected thereto for effecting rotation of the rod in response to piston reciprocation; releasable locking means engaging the rod for holding it against rotation when no fluid pressure is exerted upon the piston; and auxiliary, reversible driving means operatively connected to said locking means, said auxiliary means, when inactive holding said locking means against rotation and when active rotating said locking means for turning the rod and consequently reciprocating the piston.

6. A device in accordance with claim 5 in which the auxiliary driving means is a reversible electric motor mechanically connected to the locking means by a train of speed reducing gearing which hold said locking means against rotation while the electric motor is inactive and which rotate the locking means and its engaged rod to reciprocate the piston when said electric motor is activated.

7. An actuator comprising in combination, a housing; a cylinder supported by said housing the one open end of the cylinder extending into the housing and cooperating therewith to form an annular space within the housing, the other end of the cylinder having a head member; a reciprocative piston in the cylinder, said piston having a cylindrical extension slidably supported in the head member of the cylinder, the outer end of said extension being closed; a rod extending through the piston and mechanically connected thereto so as to rotate in response to reciprocation of the piston, said rod having a circular surface; a clutch ring operative axially into gripping engagement with the said circular surface and rotatably to turn the rod; a spring loaded, ring shaped piston slidably supported in said annular space in the housing, said ring shaped piston being connected with the clutch ring and urging it axially to grip the circular surface of the rod; ducts in the housing operative to direct fluid under pressure against said ring shaped piston for effecting disengagement of the clutch ring from the rod and concurrently to the cylinder on one side or the other of the piston therein; and an auxiliary power device connected by gearing to the clutch ring for holding said ring against rotation or for transmitting rotative motion thereto in response to activation of said auxiliary power device.

8. A device in accordance with claim 7 in which springs are interposed between the clutch engaged portion of the rod and the clutch ring, said springs being weaker than the springs loading the ring shaped piston and being operative to separate the rod and clutch ring only when the spring loaded, ring shaped piston is fluid pressure actuated.

9. A device in accordance with claim 8 in which the rod, connected to the piston, is hollow; a tubular member rotatably supported in said rod, said tubular member having a longitudinal, spiral slot of less than one convolution in its annular wall; a recess in the housing; a potentiometer in said recess operatively attached to the tubular member in the rod; and a spindle anchored at one end in the closed end of the piston extension so as to be movable therewith and having a projecting nub at its other end which extends into and moves along the spiral slot of the tubular member to turn it and its attached potentiometer for indicating the position of the piston in the cylinder.

10. An actuator comprising in combination, a housing; a cylinder secured to said housing, the one, open end of said cylinder extending into said housing to form an annular space therein, the other end of the cylinder having a head member provided with a central opening; a reciprocative piston in the cylinder, said piston having a cylindrical extension slidably supported in the central opening of the cylinder head, the outer end of said extension, protruding from the cylinder, being closed; a shaft extending axially through the piston and mechanically connected thereto for turning the shaft as the piston is reciprocated; a clutch engageable member fastened to the shaft; a clutch ring engageable with said member; springs interposed between the clutch ring and member yieldably urging them apart; a sealing member in the annular space between the cylinder and interior wall of the housing, forming a fluid chamber in said space; an end thrust collar interposed between the sealing member and clutch ring; thrust pins slidably extending through the sealing member and engaging the thrust collar; a ring piston in the said annular fluid chamber engaging the thrust pins; springs in said fluid chamber, engaging the piston, said springs being stronger than the springs between the clutch ring and the member engaged thereby, whereby the ring piston, acting through the thrust pins and collar, yieldably urges the clutch ring to engage the shaft member; ducts in the housing operative to direct fluid under pressure in the annular fluid chamber and against the piston therein for compressing the stronger springs to permit the other springs to disengage the clutch ring from the shaft member concurrently with direction of fluid to the cylinder on one side or the other of the piston therein; an electric motor; and means controlled by the electric motor and connected to the clutch ring, said means being operative to hold said clutch ring against rotation but permitting its axial movement while the electric motor is inactive and to rotate said clutch ring when the electric motor is activated.

11. A device in accordance with claim 10 in which a toothed sleeve is rotatably supported by the clutch engageable member fastened to the shaft, said sleeve being mechanically connected to the clutch ring to permit only axial movement of said ring relatively to the sleeve, said sleeve being drivingly connected to the electric motor by a train of speed reducing gearing.

12. A device in accordance with claim 5 including means operatively connected to and actuated by said rod for indicating the position of said piston in said cylinder.

13. An actuator comprising in combination, a cylinder; a reciprocative piston in said cylinder capable of fluid pressure actuation in either direction; a rod disposed in said cylinder and operatively connected to said piston whereby relative rotation will occur between said rod and said piston in response to piston reciprocation; releasable locking means operatively associated with said piston for holding it against movement when no fluid pressure is exerted upon the said piston; and auxiliary driving means operatively connected to said locking means for effecting reciprocative movements of said piston, said auxiliary means, when inactive, maintaining said locking means operative to prevent movement of said piston and when active, operative to effect movement of said piston through said locking means by rotating said rod.

HOWARD M. GEYER.

No references cited.